3,053,867
ANHYDROUS AMMONIUM SOAP
Thomas L. Reiling, Dedham, Mass., assignor to Robert B. Seth, doing business as Boston Chemical Products Company, Boston, Mass.
No Drawing. Filed Nov. 7, 1960, Ser. No. 67,470
2 Claims. (Cl. 260—413)

This invention relates to a process for producing substantially anhydrous ammonium soap; more particularly, this invention relates to the improvement in production technique for the manufacture of such soaps, which permits substantially higher conversion of the fatty acid into the ammonium soap than do other processes for the manufacture of anhydrous ammonium soaps heretofore practiced.

Ammonium soaps are usually made by reaction of a solution of ammonium hydroxide with a fatty acid. The ammonium hydroxide is diluted with water. To this hot water ammonium hydroxide solution is added the molten fatty acid. Soaps made by this process result in paste products having 20 to 75% solids as ammonium soaps. It is well known in the art that the removal of water by standard practices would result in the decomposition of the salt into the fatty acid and ammonia gas which would be lost during the removal of the water.

While it is also possible to produce ammonium soaps by treating a liquid fatty acid with an anhydrous ammonia under pressure, the process is extremely time-consuming, involves the use of high cost pressure vessels, the conversion is relatively slow and inefficient, and the process itself is too costly to warrant extensive commercial acceptance.

Also, ammonium soaps have been produced by passing ammonia gas through a composition of fatty acids dissolved in a low-boiling solvent. However, the solvent recovery is not efficient, which makes the process inefficient and expensive to conduct. Furthermore, this latter mentioned process is complicated by the need for solvent recovery equipment, in order to minimize the loss of the solvent and thereby make the process economically feasible.

It is the intention, purpose, and object of this invention to provide a process for producing substantially anhydrous ammonium salts of fatty acids.

A further object of this invention is to provide a process of producing substantially anhydrous ammonium salts of fatty acid at a yield in excess of 75% based upon the fatty acid.

It is a further object of this invention to provide an efficient process for producing substantially anhydrous ammonium salts of fatty acids, which would eliminate the need of costly equipment apparently used in those processes requiring solvent or an anhydrous gas.

I have found that these and other objects of the invention, as will be more fully explained hereinafter, can be accomplished by reacting fatty acid with the thermo decomposition products of the carbonate salts of ammonia under certain critical temperature conditions to be more fully described hereinafter.

The fatty acid, preferably from the group consisting of oleic, stearic, palmitic, or a combination of these acids, is heated in a reactor with agitation to a temperature above the decomposition point of the carbonate salt of ammonium and the melting point of the fatty acid. When the reactor reaches this temperature, a carbonate salt of ammonia, preferably ammonium carbonate or ammonium bicarbonate, or a mixture of these carbonates of ammonia, and preferably subdivided to pass through the openings of a 200 mesh screen, is rapidly added to the heated fatty acid mass. The agitation is continued. As the ammonium salt is introduced to the heated fatty acid, it decomposes, causing the mass to effervesce, and the ammonia, which is a decomposition product of the ammonium salt, reacting with water which is also produced by the decomposition of the ammonium salt, forms ammonium hydroxide. This ammonium hydroxide reacts rapidly with the heated fatty acid. Carbon dioxide gas is a by-product of the decomposition of the ammonium salt, and its evolution from the mass causes the mass to effervesce.

Because of the effervescence of the mass, tremendous surface area is provided in the fatty acid material, and it is believed that because of this tremendous surface area, high efficiency of reaction between the ammonium constituents of the ammonium carbonate or ammonium salt and fatty acid is made possible. The temperature of the reacting masses must be below the decomposition temperature of the resulting fatty ammonium ester to give the high percentage of conversion of the fatty acid to the desired ammonium ester.

My process may further be illustrated by the following examples:

Example 1.—Approximately 200 pounds of double-pressed stearic acid, having a titer of 129 to 130.5° F. and an iodine value of 7, is introduced into a 125-gallon, stainless steel jacketed kettle. The mass is heated to a temperature of 135° F., with agitation provided. 50 pounds of ammonium carbonate, preferably in a state of subdivision such that at least 10% of said ammonium carbonate passes through a 200 mesh screen, is introduced into the fatty acid mass. The agitation is continued as the carbonate salt is added to the fatty acid. The carbonate salt disperses in the fatty acid, and immediately after its addition considerable foaming of the reacting mass occurs. This effervescence is caused by the evolution of carbon dioxide gas. The foamy mass forms into a hard, waxy-like product at the 135° F. due to the formation of the ester having a melting point of 180° F., and when this occurs, the entire mass is rapidly cooled by passing cold water through the jacketed kettle. During the cooling operation, the newly formed ammonium salt of the fatty acid solidifies rapidly into a substantially anhydrous crumb mass, which can be easily powdered.

The conversion of the fatty acid to the ammonium salt of the fatty acid following this process, as determined by ether extraction (cold ether being a solvent for the fatty acid mass, whereas the ammonium salt of the fatty acid is insoluble in ether), is between 90 and 98%.

Example 2.—Palmitic acid, in the amount as set forth in Example 1, having a titer value of 128 to 132° F. and an iodine value of 2, was heated as described in Example 1, and ammonium carbonate was added. Again, it was noted that the mass effervesced, giving off carbon dioxide, and a solid crumb mass of ammonium palmitate was formed, the yield being in excess of 90% based on the palmitic acid used.

Example 3.—200 pounds of a hydrogenated fatty acid tallow material, having the trade name, "Hyfac 400" (trade name of Emery Industries, Inc.) having a titer of 57 and an iodine value of 10 was treated as in Example 1, and ammonium salt of this hydrogenated fatty acid was produced, in a yield substantially in excess of 80%, based on the weight of hydrogenated fatty acid used.

Following the practice of my processes as outlined hereinabove, I am able to produce ammonium salt of the fatty acid in yield substantially in excess of 75% based on the weight of fatty acid used. As indicated hereinabove, I attribute these high yields to the creation of tremendous surface by the effervescence of carbon dioxide as a result of the rapid thermo decomposition of the ammonium salt, that is, the ammonium carbonate or bicarbonate, and the evolution of carbon dioxide during the process. In effect, it would appear that the carbon dioxide would act somewhat as a catalyst for the production of the ammonium salt, although I am uncertain of any catalytic reaction caused by this gas in its traveling through the heated fatty acid. Whatever the cause, it is apparent by carrying out my invention, that I am able to obtain yields substantially in excess of the 20 to 40% conversion of the fatty acid to its ammonium ester commonly experienced in the production of anhydrous ammonium salts of fatty acids.

Having thus disclosed my invention, I claim:

1. A process for producing an ammonium salt of a fatty acid, selected from group consisting of stearic acid, palmitic acid and fatty acid tallow and mixtures thereof, which comprises heating said fatty acid material in a reactor, adding a carbonate salt of ammonia selected from the group consisting of ammonium carbonate and ammonium bicarbonate and mixtures thereof to the heated fatty acid, and agitating the mixture during the addition, the fatty acid being heated to a temperature in excess of the thermo decomposition temperature of the carbonate of ammonia salt and above the melting point of the fatty acid, but below the melting point of the ammonium salt of the fatty acid, before the carbonate of ammonia is added to the fatty acid.

2. The process of claim 1 wherein the fatty acid is a solid at room temperature.

No references cited.